(12) United States Patent
Du et al.

(10) Patent No.: US 9,674,568 B2
(45) Date of Patent: Jun. 6, 2017

(54) AUDIO/VIDEO SIGNAL SYNCHRONIZATION METHOD AND APPARATUS

(71) Applicant: SHENZHEN TCL NEW TECHNOLOGY CO., LTD, Shenzhen, Guangdong (CN)

(72) Inventors: Shuangqi Du, Guangdong (CN); Zitong Wang, Guangdong (CN); Renli Xie, Guangdong (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/038,050

(22) PCT Filed: Dec. 13, 2014

(86) PCT No.: PCT/CN2014/093774
§ 371 (c)(1),
(2) Date: May 20, 2016

(87) PCT Pub. No.: WO2016/029596
PCT Pub. Date: Mar. 3, 2016

(65) Prior Publication Data
US 2016/0309213 A1 Oct. 20, 2016

(30) Foreign Application Priority Data
Aug. 27, 2014 (CN) .......................... 2014 1 0429100

(51) Int. Cl.
*H04N 5/935* (2006.01)
*H04N 21/43* (2011.01)
(Continued)

(52) U.S. Cl.
CPC ..... *H04N 21/4302* (2013.01); *H04N 21/4104* (2013.01); *H04N 21/4131* (2013.01);
(Continued)

(58) Field of Classification Search
CPC ...................... H04N 21/4302; H04N 21/4104
(Continued)

(56) References Cited

U.S. PATENT DOCUMENTS

| | | | |
|---|---|---|---|
| 2009/0135856 A1* | 5/2009 | Gha | H04R 5/04 370/503 |
| 2010/0142723 A1* | 6/2010 | Bucklen | H04R 3/02 381/81 |

(Continued)

*Primary Examiner* — Mishawn Hunter (57) ABSTRACT

Disclosed is an audio/video signal synchronization method which includes: acquiring a delay data value of an audio signal formed by a wireless module of an audio/video signal synchronization apparatus and a wireless audio device; according to a display format of a video data to be played, calculating playing time of each frame of the video data to be played; according to the delay data value and the playing time of each frame, calculating the number of frames to be buffered, and generating and buffering the frames with the corresponding number; and according to an audio/video playing instruction, playing the buffered frames and the video data to be played sequentially, and transmitting audio data corresponding to the video data to be played to the wireless audio device to play the audio data while playing the buffered frames. Also disclosed is an audio/video signal synchronization apparatus.

6 Claims, 5 Drawing Sheets

(51) Int. Cl.
*H04N 21/41* (2011.01)
*H04N 21/4363* (2011.01)
*H04N 21/439* (2011.01)

(52) U.S. Cl.
CPC ..... *H04N 21/4307* (2013.01); *H04N 21/4392* (2013.01); *H04N 21/43637* (2013.01)

(58) Field of Classification Search
USPC ................................ 386/200, 201, 203, 248
See application file for complete search history.

(56) References Cited

U.S. PATENT DOCUMENTS

| | | | | |
|---|---|---|---|---|
| 2010/0295993 | A1* | 11/2010 | Oh | H04N 5/04 348/516 |
| 2012/0063603 | A1* | 3/2012 | Evans | H04N 21/6156 381/17 |
| 2012/0206650 | A1* | 8/2012 | Lin | H04N 5/60 348/515 |

* cited by examiner

AUDIO/VIDEO SIGNAL SYNCHRONIZATION METHOD AND APPARATUS

TECHNICAL FIELD

The present disclosure relates to the field of audio/video playing technology, and in particular, to an audio/video signal synchronization method and apparatus.

BACKGROUND

With the popularity of a wireless audio device (such as a Wifi speaker, a 2.4G wireless speaker and a Bluetooth speaker), a wireless audio device has found increasing application in audio/video signal synchronization apparatus such as a television, a television set-top box, a projector and so on. The audio data needs to be encoded or decoded during wireless transmission, and it takes some time for an encoding/decoding process of the audio data. Thus, when corresponding audio/video data is played, a delay phenomena may occur, which influences the visual and aural effect of a user.

SUMMARY

A major objective of the present disclosure is to solve the technical issue where the audio and video signal is non-synchronous due to the delay of the audio signal caused by wireless transmission.

To implement the foregoing objective, the present disclosure provides an audio/video signal synchronization method which includes:

acquiring a delay data value of an audio signal formed by a wireless module of an audio/video signal synchronization apparatus and a wireless audio device;

calculating playing time of each frame of a video data to be played according to a display format of the video data to be played;

calculating the number of frames to be buffered according to the delay data value and the playing time of each frame, and generating and buffering the frames with the corresponding number; and playing the buffered frames and the video data to be played sequentially according to an audio/video playing instruction, and transmitting an audio data corresponding to the video data to be played to the wireless audio device while playing the buffered frames, so that the audio data is played on the wireless audio device.

Preferably, after the calculating the number of frames to be buffered, the audio/video signal synchronization method further includes:

calculating capacity of each frame, and calculating and establishing a buffer space to buffer the frames to be buffered according to the number of the frames to be buffered and capacity of each frame.

Preferably, the acquiring a delay data value of an audio signal formed by a wireless module of an audio/video signal synchronization apparatus and a wireless audio device specifically further includes:

determining whether the wireless module of the audio/video signal synchronization apparatus is a plug-in module;

if not, acquiring a delay time value of the wireless module of the audio/video signal synchronization apparatus itself and a delay time value of the wireless audio device, and using the sum of the delay time value of the wireless module and the delay time value of the wireless audio device as the delay data value of the audio signal; if yes, generating prompt information to inform a user to input a delay time value of the plug-in module; and receiving the delay time value of the plug-in module input by the user, acquiring the delay time value of the wireless audio device, and using the sum of the delay time value of the plug-in module and the delay time value of the wireless audio device as the delay data value of the audio signal.

Preferably, the buffered frames are pictures in the video data to be played.

Preferably, the buffered frames are black screen pictures.

In addition, to implement the foregoing objective, the present disclosure provides an audio/video signal synchronization apparatus which includes:

an acquiring module, configured to acquire a delay data value of an audio signal formed by a wireless module of the audio/video signal synchronization apparatus and a wireless audio device;

a calculating module, configured to calculate playing time of each frame of a video data to be played according to a display format of the video data to be played, and configured to calculate the number of frames to be buffered according to the delay data value and the playing time of each frame;

a buffering module, configured to generate and buffer the frames with the corresponding number according to the number of the frames to be buffered; and a processing module, configured to play the buffered frames and the video data to be played sequentially according to an audio/video playing instruction, and configured to transmit an audio data corresponding to the video data to be played to the wireless audio device while playing the buffered frames, so that the audio data is played on the wireless audio device.

Preferably, the audio/video signal synchronization apparatus further includes:

an establishing module, configured to calculate capacity of each frame, and configured to calculate and establish a buffer space to buffer the frames to be buffered according to the number of the frames to be buffered and capacity of each frame.

Preferably, the acquiring module includes:

a determining unit, configured to determine whether the wireless module of the audio/video signal synchronization apparatus is a plug-in module;

an acquiring unit, configured to acquire, when the wireless module is not the plug-in module, a delay time value of the wireless module of the audio/video signal synchronization apparatus itself and a delay time value of the wireless audio device, and configured to use the sum of the delay time value of the wireless module and the delay time value of the wireless audio device as the delay data value of the audio signal;

a prompting unit, configured to generate, when the wireless module is the plug-in module, prompt information to inform a user to input a delay time value of the wireless module; and a receiving unit, configured to receive the delay time value of the wireless module input by the user, and configured to acquire the delay time value of the wireless audio device, and configured to use the sum of the delay time value of the plug-in module and the delay time value of the wireless audio device as the delay data value of the audio signal.

Preferably, the buffered frames are pictures in the video data to be played.

Preferably, the buffered frames are black screen pictures.

In an audio/video signal synchronization method and apparatus provided by the present disclosure, a delay data value of an audio signal formed by a wireless module of an audio/video signal synchronization apparatus and a wireless audio device is acquired; playing time of each frame of a video data to be played is calculated according to a display format of the video data to be played; the number of frames to be buffered is calculated according to the delay data value and the playing time of each frame, and the frames with the corresponding number is generated and buffered; and the buffered frames and the video data to be played are played sequentially according to an audio/video playing instruction, and an audio data corresponding to the video data to be played is transmitted to the wireless audio device while playing the buffered frames, so that the audio data is played on the wireless audio device. The method and apparatus provided in the present disclosure guarantee that the buffered frames are played out completely in a duration from receiving the audio/video playing instruction to playing the audio and video data, achieve synchronous playing of the audio and the video data, and guarantee visual and aural experience effects of a user.

To make the objectives, features, and advantages of the present disclosure more comprehensible, the following describes the embodiments of the present disclosure with reference to the accompanying drawings.

DESCRIPTION OF EMBODIMENTS

It should be understood that the specific embodiments described herein are merely used for describing the present disclosure, but are not intended to limit the present disclosure.

Figure 1:
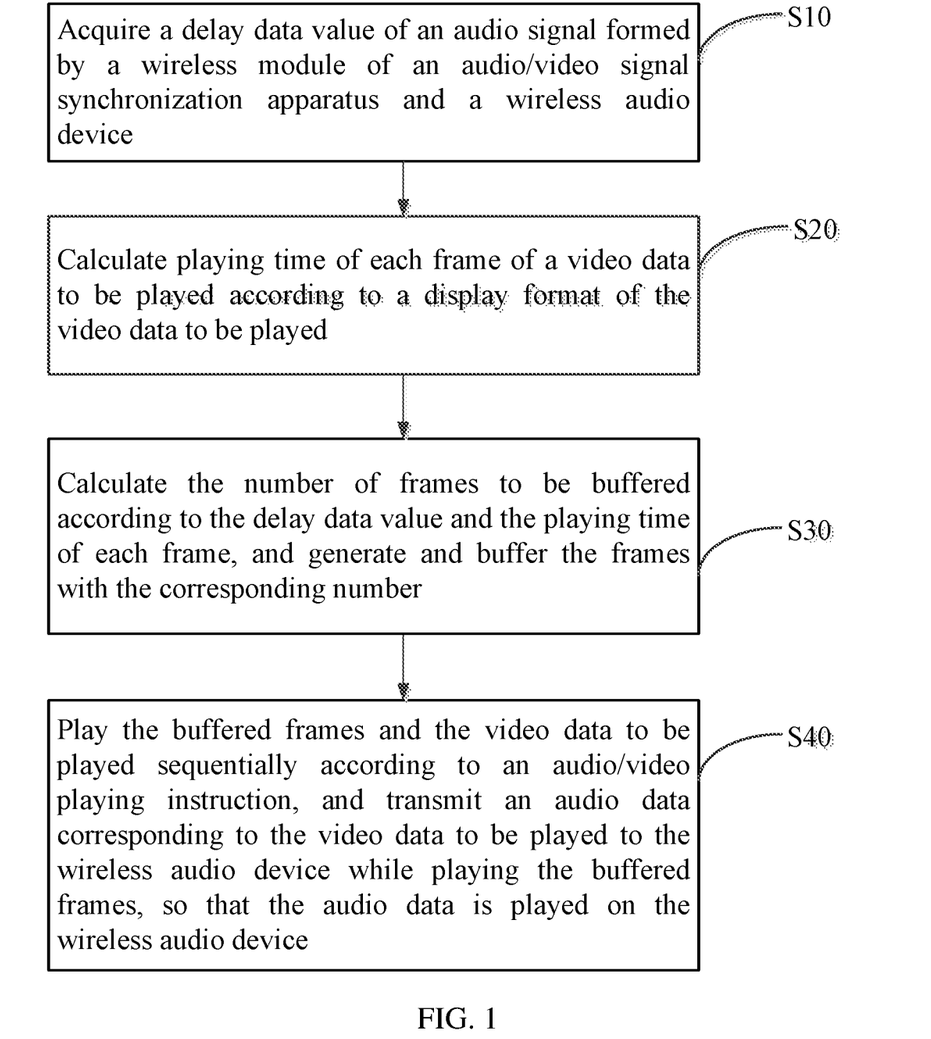
FIG. 1 is a schematic flowchart of an audio/video signal synchronization method according to a first embodiment of the present disclosure.

Referring to FIG. 1, the present disclosure provides an audio/video signal synchronization method. FIG. 1 is a schematic flowchart of an audio/video signal synchronization method according to a first embodiment of the present disclosure. In the first embodiment, the audio/video signal synchronization method includes:

Step S10: Acquire a delay data value of an audio signal formed by a wireless module of an audio/video signal synchronization apparatus and a wireless audio device.

In the embodiment, before step S10, the audio/video signal synchronization apparatus first needs to detect whether the wireless module thereof has established a wireless communication link with the wireless audio device. Only after the wireless module is determined to be established a wireless communication link with the wireless audio device, operation of the S10 is executed. The type of the wireless communication link includes but is not limited to: WIFI and Bluetooth.

In the embodiment, the wireless module of the audio/video signal synchronization apparatus is configured to communicate wirelessly with the wireless audio device, and configured to encode the audio signal in the audio/video signal synchronization apparatus, and configured to transmit the encoded audio signal to the wireless audio device by wireless transmission. That is, the audio/video signal synchronization apparatus establishes the wireless communication link with the wireless audio device by the wireless module.

In the embodiment, the delay data value of the audio signal includes a delay time value resulting from the wireless module encoding the audio signal and a delay time value resulting from the wireless audio device decoding the audio signal after receiving the audio signal.

Figure 2:
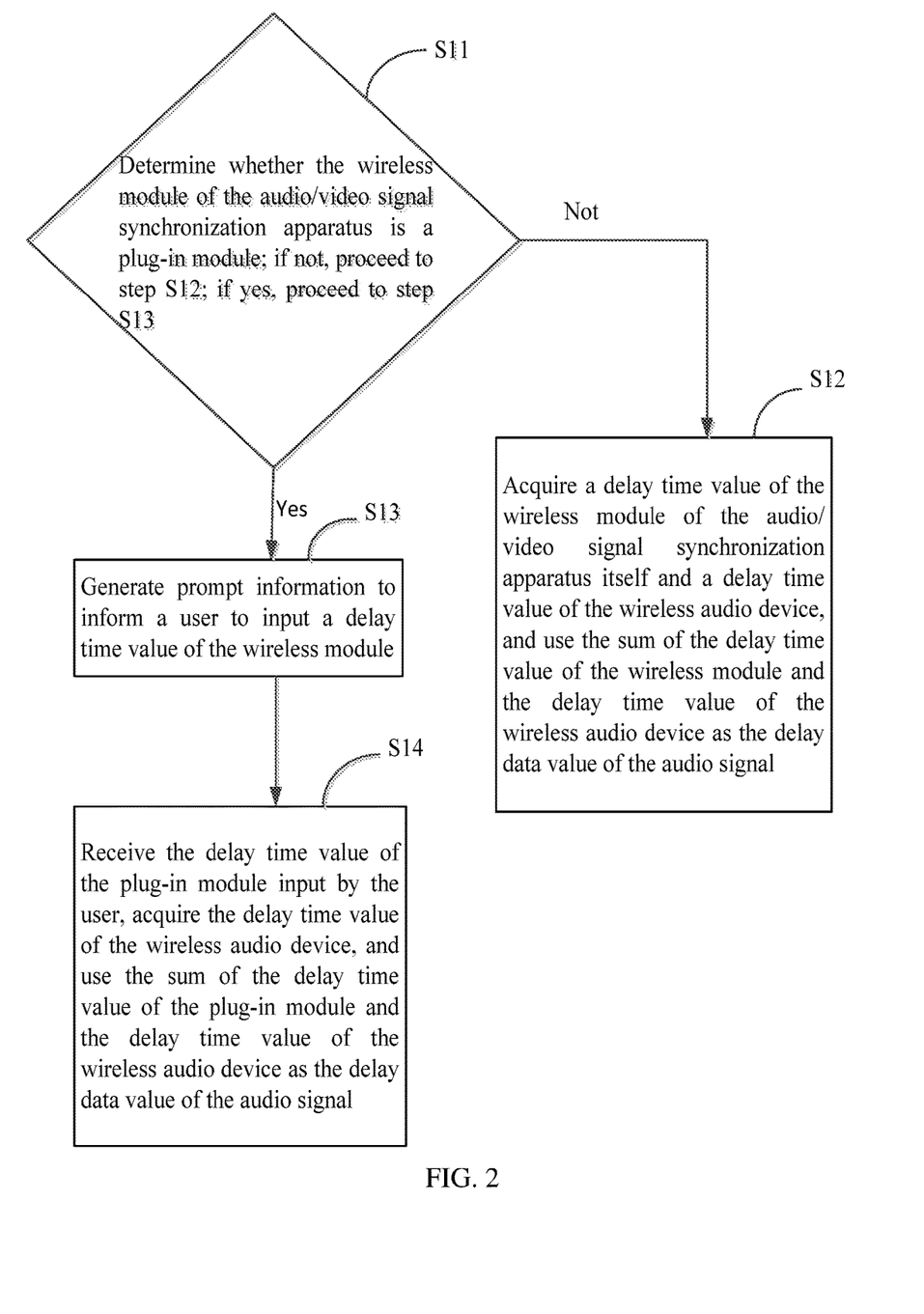
FIG. 2 is a schematic flowchart of a specific implementation of step S10 in FIG. 1.

In the embodiment, the wireless module of the audio/video signal synchronization apparatus may be a plug-in module. When the wireless module of the audio/video signal synchronization apparatus is the plug-in module, because type of the plug-in module a user buys differ from one user to another user, the delay time value of the audio signal caused by the plug-in module is unable to be known by the audio/video signal synchronization apparatus. However, the bought plug-in module, if authentic, will be provided with instructions. In the instructions, related performance parameters of the plug-in module, such as the delay time value, are described. That is, the user can know the delay time value of the plug-in module according to the instructions of the plug-in module. In addition, the wireless module may be a non plug-in module, namely, integrated on the audio/video signal synchronization apparatus. When the wireless module is the non plug-in module, related parameters of the wireless module, such as a delay time value, are saved in a corresponding storage space of the audio/video signal synchronization apparatus, and the audio/video signal synchronization apparatus can directly acquire the delay time value of the wireless module. Similarly, related parameters of the wireless audio device are also saved in a corresponding storage space of the wireless audio device. That is, the wireless audio device know the delay time value thereof, and the audio/video signal synchronization apparatus can acquire the delay time value of the wireless audio device from the wireless audio device. When the wireless module is the plug-in module, the audio/video signal synchronization apparatus first generates prompt information to inform a user to input a delay time value of the plug-in module, then acquires a delay time value of the wireless audio device, and use the sum of the delay time value input by the user and the delay time value of the wireless audio device as the delay data value of the audio signal formed by the wireless module and the wireless audio device. When the wireless module is a non plug-in module, the audio/video signal synchronization apparatus acquires a delay time value of the wireless module of itself and a delay time value of the wireless audio device, and uses the sum of the delay time value of the wireless module and the delay time value of the wireless audio device as the delay data value of the audio signal. Specifically, as shown in FIG. 2, FIG. 2 is a schematic flowchart of a specific implementation of step S10 in FIG. 1. A specific process of step S10 includes the following steps:

Step S11: Determine whether the wireless module of the audio/video signal synchronization apparatus is a plug-in module; if not, proceed to step S12; if yes, proceed to step S13.

Step S12: Acquire a delay time value of the wireless module of the audio/video signal synchronization apparatus itself and a delay time value of the wireless audio device, and use the sum of the delay time value of the wireless module and the delay time value of the wireless audio device as the delay data value of the audio signal.

Step S13: Generate prompt information to inform a user to input a delay time value of the wireless module.

Step S14: Receive the delay time value of the plug-in module input by the user, acquire the delay time value of the wireless audio device, and use the sum of the delay time value of the plug-in module and the delay time value of the wireless audio device as the delay data value of the audio signal.

Step S20: Calculate playing time of each frame of a video data to be played according to a display format of the video data to be played.

Because the playing time of each frame varies from different display formats of the video data, once the display format of the video data is determined, the corresponding playing time of each frame of the video data can be calculated. For example, the corresponding playing time of each frame, of the video data whose display format is 1080P@60 Hz, is 1 s/60=16.7 ms.

Step S30: Calculate the number of frames to be buffered according to the delay data value and the playing time of each frame, and generate and buffer the frames with the corresponding number.

In the step, the length of playing time for all the frames to be buffered is equal to the delay data value.

After the number of the frames to be buffered is calculated, step S30 further includes the following processing: calculating capacity of each frame, and calculating and establishing a buffer space according to the number of the frames to be buffered and capacity of each frame. The established buffer space is configured to buffer the frames to be buffered. The size of the buffer space is equal to or greater than the size of the capacity of the frames to be buffered, so as to ensure that the buffer space can contain all the frames to be buffered.

A specific process of step S30 includes the following steps: first calculating the number of the frames to be buffered according to the delay data value and the playing time of each frame, then generating the frames to be buffered with the corresponding number, and finally buffering the generated frames with the corresponding number to the foregoing established buffer space.

In the embodiment, the buffered frames are pictures in the video data to be played. That is, the buffered frames may be copied form the video data to be played, such as copied form frames at the prior 10 seconds of the video data to be played, preferably copied form frames at the prior 1 second of the video data to be played. In addition, the buffered frames may be also black screen pictures.

Step S40: Play the buffered frames and the video data to be played sequentially according to an audio/video playing instruction, and transmit an audio data corresponding to the video data to be played to the wireless audio device while playing the buffered frames, so that the audio data is played on the wireless audio device.

In the embodiment, the delay data value of the audio signal formed by the wireless module of the audio/video signal synchronization apparatus and the wireless audio device is acquired. Playing time of each frame of a video data to be played is calculated according to a display format of the video data to be played. The number of frames to be buffered is calculated according to the delay data value and the playing time of each frame, and the frames with the corresponding number is generated and buffered. When an audio/video playing instruction is received, the buffered frames are first played, and then the video data to be played is played sequentially. An audio data corresponding to the video data to be played is transmitted to the wireless audio device at the beginning of playing the buffered frames, because the length of playing time for all the frames to be buffered is equal to the delay data value of the audio signal formed by the audio/video signal synchronization apparatus and the wireless audio device. When the wireless audio device stars to play the audio data, the audio/video signal synchronization apparatus just plays out the buffered frames completely, and stars to play the video data to be played, so as to achieve synchronous playing of the audio and the video data and guarantee visual and aural experience effects of a user.

Figure 3:
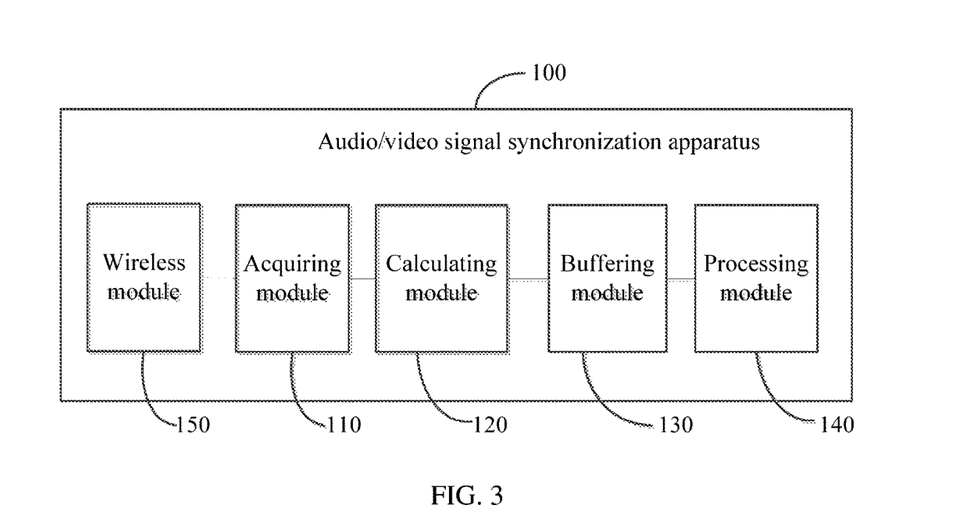
FIG. 3 is a schematic diagram showing function modules of an audio/video signal synchronization apparatus according to a first embodiment of the present disclosure.

Referring to FIG. 3, the present disclosure further provides an audio/video signal synchronization apparatus. FIG. 3 is a schematic diagram showing modules of an audio/video signal synchronization apparatus according to a first embodiment of the present disclosure. In the first embodiment, the audio/video signal synchronization apparatus 100 includes: an acquiring module 110, a calculating module 120, buffering module 130, a processing module 140, and a wireless module 150. The acquiring module 110 is configured to acquire a delay data value of an audio signal formed by the wireless module 150 of an audio/video signal synchronization apparatus and a wireless audio device. The calculating module 120 is configured to calculate playing time of each frame of a video data to be played according to a display format of the video data to be played, and configured to calculate the number of frames to be buffered according to the delay data value and the playing time of each frame. The buffering module 130 is configured to generate and buffer the frames with the corresponding number according to the number of the frames to be buffered. The processing module 140 is configured to play the buffered frames and the video data to be played sequentially according to an audio/video playing instruction, and configured to transmit an audio data corresponding to the video data to be played to the wireless audio device while playing the buffered frames, so that the audio data is played on the wireless audio device.

In the audio/video signal synchronization apparatus 100 of the embodiment, the wireless module 150 is configured to communicate wirelessly with the wireless audio device, and specifically configured to encode the audio signal, and to transmit the encoded audio signal to the wireless audio device by wireless transmission. That is, the audio/video signal synchronization apparatus 100 establishes the wireless communication link with the wireless audio device by using the wireless module 150. Thus, before acquiring the delay data value of the audio signal formed by the wireless module 150 and the wireless audio device, the audio/video signal synchronization apparatus 100 first needs to detect whether the wireless module 150 has established a wireless communication link with the wireless audio device. Only after the wireless module 150 is determined to be established a wireless communication link with the wireless audio device, operation of acquiring the delay data value is executed. The type of the wireless communication link includes but is not limited to: WIFI and Bluetooth.

In the embodiment, because the playing time of each frame varies from different display formats of the video data, once the display format of the video data is determined, the corresponding playing time of each frame of the video data can be calculated. For example, the corresponding playing time of each frame, of the video data whose display format is 1080P@60 Hz, is 1 s/60=16.7 ms.

In the embodiment, the delay data value of the audio signal includes a delay time value resulting from the wireless module encoding the audio signal and a delay time value resulting from the wireless audio device decoding the audio signal after receiving the audio signal.

Figure 4:
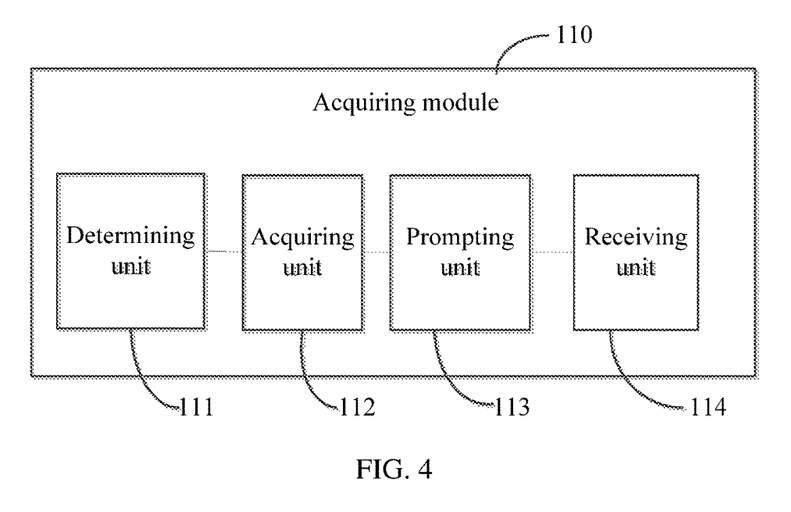
FIG. 4 is a schematic diagram showing specific function modules of an acquiring module in FIG. 3.

Referring to FIG. 4, FIG. 4 is a schematic diagram showing specific function modules of an acquiring module in FIG. 3. The acquiring module 110 includes: a determining unit 111, an acquiring unit 112, a prompting unit 113, and a receiving unit 114. The determining unit 111 is configured to determine whether the wireless module 150 is a plug-in module. The acquiring unit 112 is configured to acquire, when the wireless module 150 is not the plug-in module, a delay time value of the wireless module of the audio/video signal synchronization apparatus itself and a delay time value of the wireless audio device, and configured to use the sum of the delay time value of the wireless module and the delay time value of the wireless audio device as the delay data value of the audio signal. The prompting unit 113 is configured to generate, when the wireless module 150 is the plug-in module, prompt information to inform a user to input a delay time value of the plug-in module. The receiving unit 114 is configured to receive the delay time value of the plug-in module input by the user, and configured to acquire the delay time value of the wireless audio device, and configured to use the sum of the delay time value of the plug-in module and the delay time value of the wireless audio device as the delay data value of the audio signal.

In the embodiment, the wireless module 150 of the audio/video signal synchronization apparatus 100 may be the plug-in module. When the wireless module 150 of the audio/video signal synchronization apparatus 100 is the plug-in module, because type of the plug-in module a user buys differ from one user to another user, the delay time value of the audio signal caused by the plug-in module is unable to be known by the audio/video signal synchronization apparatus 100. However, the bought plug-in module, if authentic, will be provided with instructions. In the instructions, related performance parameters of the plug-in module, such as the delay time value, are described. That is, the user can know the delay time value of the plug-in module according to the instructions of the plug-in module. In addition, the wireless module 150 may be a non plug-in module, namely, integrated on the audio/video signal synchronization apparatus 100. When the wireless module 150 is the non plug-in module, related parameters of the wireless module, such as a delay time value, are saved in a corresponding storage space of the audio/video signal synchronization apparatus 100, and the acquiring module 110 can directly acquire the delay time value of the wireless module 150 by using the acquiring unit 112. Similarly, related parameters of the wireless audio device are also saved in a corresponding storage space of the wireless audio device. That is, the wireless audio device know the delay time value thereof, and the acquiring unit 112 of the audio/video signal synchronization apparatus 100 and the receiving unit 114 can both acquire the delay time value of the wireless audio device from the wireless audio device. When the wireless module 150 is the plug-in module, the audio/video signal synchronization apparatus 100 first generates, by using the prompting unit 113, prompt information o inform a user to input a delay time value of the plug-in module, then acquires, by using the receiving unit 114, a delay time value of the wireless audio device, and use the sum of the delay time value input by the user and the delay time value of the wireless audio device as the delay data value of the audio signal formed by the wireless module 150 and the wireless audio device. When the wireless module is a non plug-in module, a delay time value of the wireless module 150 and a delay time value of the wireless audio device is acquired by using the acquiring unit 112, and the sum of the delay time value of the wireless module and the delay time value of the wireless audio device is used as the delay data value of the audio signal.

Figure 5:
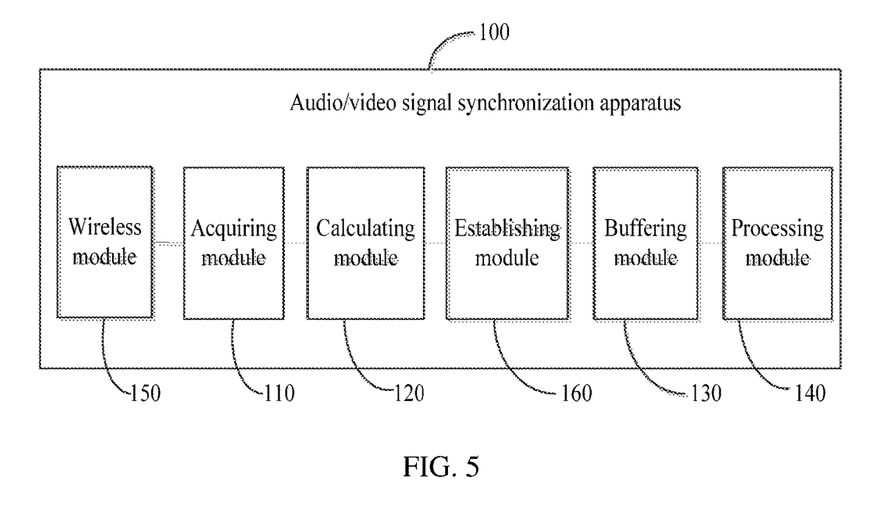
FIG. 5 is a schematic diagram showing function modules of an audio/video signal synchronization apparatus according to a second embodiment of the present disclosure.

Referring to FIG. 5, FIG. 5 is a schematic diagram showing function modules of an audio/video signal synchronization apparatus according to a second embodiment of the present disclosure. The embodiment, on the basis of the first embodiment, further includes an establishing module 160. The establishing module 160 is configured to calculate capacity of each frame, and configured to calculate and establish a buffer space to buffer the frames to be buffered according to the number of the frames to be buffered and capacity of each frame. The size of the buffer space is equal to or greater than the size of the capacity of the frames to be buffered, so as to ensure that the buffer space can contain all the frames to be buffered.

In the embodiment, the buffering module 130 first calculates the number of the frames to be buffered according to the delay data value and the playing time of each frame, then generates the frames to be buffered with the corresponding frames number, finally buffer the generated frames with the corresponding number to the foregoing established the buffer space. The length of playing time for all the frames to be buffered is equal to the delay data value. The buffered frames may be frames in the video data to be played. That is, the buffered frames may be copied form the video data to be played, such as copied form the frames at the prior 10 seconds of the video data to be played, preferably copied form the frames at the prior 1 second of the video data to be played. In addition, the buffered frames may be also black screen pictures.

In the embodiment: A delay data value of an audio signal formed by a wireless module 150 of an audio/video signal synchronization apparatus 100 and a wireless audio device is acquired. Playing time of each frame of a video data to be played is calculated according to a display format of the video data to be played. The number of frames to be buffered is calculated according to the delay data value and the playing time of each frame, and the frames with the corresponding number is generated and buffered. When an audio/video playing instruction is received, the buffered frames are first played, and then the video data to be played is played sequentially. An audio data corresponding to the video data to be played is transmitted to a wireless audio device at the beginning of playing the buffered frames, because the length of playing time for all the frames to be buffered is equal to the delay data value of the audio signal formed by an audio/video signal synchronization apparatus and a wireless audio device. When the wireless audio device stars to play the audio data, the audio/video signal synchronization apparatus just plays out the buffered frames completely, and stars to play the video data to be played, so as to achieve synchronous playing of the audio and the video data and guarantee visual and aural experience effects of a user.

The following further describes the present disclosure by using a specific embodiment.

A display format of the video data HDMI to be played is set to be 1080P@60 Hz, where capacity of each frame is 1920*1080*2 Byte=4.1472 MByte (YC uncompressed video), and the playing time of each frame is 1 s/60=16.7 ms. If, among a wireless audio device and an audio/video signal synchronization apparatus, a wireless Bluetooth connection is establish (i.e., Bluetooth is integrated on the audio/video signal synchronization apparatus). A delay data value of an audio signal formed by the audio/video signal synchronization apparatus and the wireless audio device is 105 ms (A delay time value 5 ms resulting from a wireless module (Bluetooth) encoding the audio signal and a delay time value 100 ms resulting from the wireless audio device decoding the audio signal are included.).

The procedure for the audio/video signal synchronization apparatus to implement the audio/video signal synchronization method is as follows: The audio/video signal synchronization apparatus first acquires the delay data, which is 105 ms, of the audio signal formed by the wireless module and the wireless audio device. According to the playing time of each frame, the number of frames to be buffered is calculated to be (100+5)/16.7=6.3≈6 Frames, where the 6 frames are set to be f1, f2, f3, f4, f5 and f6 respectively. According to the capacity of each frame, the size of the buffer space is calculated to be R=4.1472 MByte*6=24.8832 MByte. Then the buffer space, whose size is equal to or greater than 24.8832 MByte, is established, and the buffered frames f1-f6 are buffered to the buffer space. When an audio/video playing instruction is received, the buffered frames f1-f6 is first played, and at the beginning of playing frames in the buffer space, an audio data corresponding to the video data HDMI is decoded, and then transmitted to the wireless audio device, so that the audio data is decoded and played by the wireless audio device. Because the playing time for the buffered frames is equal to the delay data value of the audio signal, when the wireless audio device stars to play the decoded audio data, the audio/video signal synchronization apparatus just plays out the buffered frames completely, and stars to play the original video data HDM, so as to achieve signal synchronous playing of the original video data HDM and the corresponding audio data.

Furthermore, it is apparent to those skilled in the art that the present disclosure also provides an audio/video signal synchronization apparatus, the apparatus comprising a non-transitory program storage medium and one or more processors. The non-transitory program storage medium stores program code executable by the one or more processors to perform the methods as described above. Furthermore, it is apparent to those skilled in the art that various units or modules 110, 120, 130, 140, 150, 111, 112, 113, 114, and 160, as shown in FIGS. 3-5, can be software modules or software units. In another aspect, it is well-known that various software modules or software units can be inherently stored in the non-transitory program storage medium and executed by the one or more processors.

The foregoing is only preferred embodiments of the present disclosure is not patented and therefore limit the scope of the present disclosure, any use of the contents of the present specification and drawings made equivalent or equivalent structural transformation process, either directly or indirectly used in other relevant technology, are included in the patent empathy scope of the invention.

What is claimed is:

1. An audio/video signal synchronization method, comprising:
   acquiring a delay data value of an audio signal formed by a wireless module of an audio/video signal synchronization apparatus and a wireless loudspeaker box device;
   calculating playing time of each frame of a video data to be played according to a display format of the video data to be played;
   calculating the number of frames to be buffered according to the delay data value and the playing time of each frame, and generating and buffering the corresponding number of frames; and
   playing the buffered frames sequentially according to an audio/video playing instruction, and transmitting an audio data corresponding to the video data to be played to a wireless audio device while playing the buffered frames, so that the audio data is played on the wireless audio device;
   wherein the acquiring the delay data value of the audio signal comprises:
   determining whether the wireless module in the audio/video signal synchronization apparatus is a plug-in module;
   if the wireless module is not a plug-in module, acquiring a delay time value of the wireless module of the audio/video signal synchronization apparatus by itself and a delay time value of the wireless loudspeaker box device, and taking the sum of the delay time value of the wireless module and the delay time value of the wireless loudspeaker box device as the delay data value of the audio signal; otherwise if the wireless module is a plug-in module, generating a prompt message to inform a user to input a delay time value of the plug-in module; and
   receiving the delay time value of the plug-in module input by the user, acquiring the delay time value of the wireless loudspeaker box device, and taking the sum of the delay time value of the plug-in module and the delay time value of the wireless loudspeaker box device as the delay data value of the audio signal.

2. The audio/video signal synchronization method according to claim 1, wherein the buffered frame is a frame in the video data to be played.

3. The audio/video signal synchronization method according to claim 1, wherein the buffered frame is a black screen frame.

4. An audio/video signal synchronization apparatus, comprising at least one processor and a non-transitory program storage medium containing program code executable by the at least one processor, the program code comprising:
   an acquiring module configured to acquire a delay data value of an audio signal formed by a wireless module of the audio/video signal synchronization apparatus and a wireless loudspeaker box device;
   a calculating module configured to calculate playing time of each frame of a video data to be played according to a display format of the video data to be played, and configured to calculate the number of frames to be buffered according to the delay data value and the playing time of each frame;
   a buffering module configured to generate and buffer the corresponding number of frames according to the number of the frames to be buffered; and
   a processing module configured to play the buffered frames sequentially according to an audio/video playing instruction, and configured to transmit an audio data corresponding to the video data to be played to a wireless audio device while playing the buffered frames, so that the audio data is played on the wireless audio device;
   wherein the acquiring module comprises:
   a determining unit configured to determine whether the wireless module in the audio/video signal synchronization apparatus is a plug-in module;

an acquiring unit configured to acquire, when the wireless module is not a plug-in module, a delay time value of the wireless module of the audio/video signal synchronization apparatus by itself and a delay time value of the wireless loudspeaker box device, and take the sum of the delay time value of the wireless module and the delay time value of the wireless loudspeaker box device as the delay data value of the audio signal;

a prompting unit configured to generate, when the wireless module is a plug-in module, prompt information to inform a user to input a delay time value of the wireless module; and a receiving unit configure to receive the delay time value of the wireless module input by the user, acquire the delay time value of the wireless loudspeaker box device, and take the sum of the delay time value of the plug-in module and the delay time value of the wireless loudspeaker box device as the delay data value of the audio signal.

5. The audio/video signal synchronization apparatus according to claim 4, wherein the buffered frame is a frame in the video data to be played.

6. The audio/video signal synchronization apparatus according to claim 4, wherein the buffered frame is a black screen frame.

* * * * *